United States Patent
Kraft

(10) Patent No.: US 8,819,051 B2
(45) Date of Patent: Aug. 26, 2014

(54) TAGGING OFFLINE CONTENT WITH CONTEXT-SENSITIVE SEARCH-ENABLING KEYWORDS

(75) Inventor: Reiner Kraft, Gilroy, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2120 days.

(21) Appl. No.: 11/239,708

(22) Filed: Sep. 29, 2005

(65) Prior Publication Data

US 2007/0073669 A1  Mar. 29, 2007

(51) Int. Cl.
G06F 7/00 (2006.01)
G06F 17/30 (2006.01)

(52) U.S. Cl.
USPC ............................ 707/767; 707/765; 707/706

(58) Field of Classification Search
None
See application file for complete search history.

(56) References Cited

U.S. PATENT DOCUMENTS

| | | | |
|---|---|---|---|
| 5,619,709 A | 4/1997 | Caid et al. | |
| 5,734,887 A | 3/1998 | Kingberg et al. | |
| 5,822,539 A | 10/1998 | van Hoff | |
| 6,064,979 A * | 5/2000 | Perkowski | 705/26 |
| 6,356,922 B1 | 3/2002 | Schilit et al. | |
| 6,460,036 B1 | 10/2002 | Herz | |
| 6,671,683 B2 | 12/2003 | Kanno | |
| 6,804,659 B1 | 10/2004 | Graham et al. | |
| 6,891,635 B2 | 5/2005 | Dutta | |
| 6,947,930 B2 | 9/2005 | Anick et al. | |
| 7,007,074 B2 | 2/2006 | Radwin | |
| 7,028,024 B1 | 4/2006 | Kommers et al. | |
| 7,941,428 B2 | 5/2011 | Huston | |
| 7,979,457 B1 | 7/2011 | Garman | |
| 2002/0105532 A1 | 8/2002 | Oblinger | |
| 2002/0194070 A1 | 12/2002 | Totham et al. | |
| 2003/0051214 A1 | 3/2003 | Graham et al. | |
| 2003/0135582 A1 | 7/2003 | Allen et al. | |
| 2004/0054627 A1 * | 3/2004 | Rutledge | 705/50 |
| 2004/0158852 A1 * | 8/2004 | Wysocki | 725/32 |
| 2005/0165642 A1 | 7/2005 | Brouze et al. | |
| 2005/0228787 A1 | 10/2005 | Linden et al. | |
| 2006/0156222 A1 | 7/2006 | Chi et al. | |

(Continued)

OTHER PUBLICATIONS

International Searching Authority, "Notification of Transmittal of the International Search Report and the Written Opinion of the International Searching Authority, or the Declaration", international application No. PCT/US06/39028, Received Aug. 29, 2007, 6 pages.

(Continued)

*Primary Examiner* — Dung K Chau
(74) *Attorney, Agent, or Firm* — Hickman Palermo Truong Becker Bingham Wong LLP; Edward A. Becker

(57) ABSTRACT

Techniques for providing information about "offline" content are provided. In one technique, content (e.g., televised or paper-printed content) is "tagged" with a service-associated icon and a keyword. A person seeing the icon in the content may submit the keyword to the service via his web browser. The service responsively submits search-limiting criteria, associated with the keyword, as query terms to a search engine. The search engine determines relevant web pages based on the query terms, dynamically generates search results and returns the search results to either the web browser or the service, which may dynamically generate and send to the web browser another web page containing the search results. Due to the automatic addition of the search-limiting criteria to the query terms, the set of web pages that the search engine determines to be relevant is narrower and more focused than the set otherwise would be.

18 Claims, 4 Drawing Sheets

(56) References Cited

U.S. PATENT DOCUMENTS

| | | | |
|---|---|---|---|
| 2006/0195382 A1* | 8/2006 | Sung | 705/37 |
| 2006/0230415 A1* | 10/2006 | Roeding | 725/34 |
| 2007/0043612 A1* | 2/2007 | Koplovitz et al. | 705/14 |
| 2007/0061298 A1* | 3/2007 | Wilson et al. | 707/3 |
| 2007/0083429 A1 | 4/2007 | Kraft | |
| 2007/0203820 A1* | 8/2007 | Rashid | 705/37 |
| 2007/0220520 A1* | 9/2007 | Tajima | 718/104 |
| 2007/0282797 A1* | 12/2007 | Wang et al. | 707/3 |
| 2007/0282813 A1* | 12/2007 | Cao et al. | 707/3 |

OTHER PUBLICATIONS

Claims, international application No. PCT/US06/39028, 5 pages.
allyourwords.com, "AllYourWords .com," AllYourWords 1.0 Search Engine, 2005, locate on the internet at <http://allyourwords.com/>, retrieved on Dec. 14, 2005, 1 page.
Netscape, "Internet Keywords FAQ," Netscape, 2004, retrieved from the internet at <http://wp.netscape.com/escapes/keywords/faq.html>, retrieved on Dec. 14, 2005, 6 pages.
Parker, Pamela, "AOL, PBS Forge Online, On-air Alliance," Click Z Network, Solutions for Marketers, Jan. 10, 2000, located on the internet at <http://www.clickz.com/news/article.php/12_278621>, retrieved on Dec. 14, 2005, 2 pages.
Yahoo!, "Yahoo!Search, Y!Q Beta, Search in Context," Yahoo! Inc, 2005, located on the internet at <http://yq.search.yahoo.com/publisher/faq.html>, retrieved on Dec. 14, 2005, 10 pages.
Finkelstein, L. et al., "Placing Search in Context: The Concept Revisited" 2002 ACM (18 pages).
Sugiyama, K. et al., "Adaptive Web Search Based on User Profile Constructed without Any Effort from Users" WWW2004, May 17-22, 2004 (12 pages).
Chinese Office Action received in application serial No. 200680037856.X dated Sep. 7, 2010 (8 pages).
Current Claims of Chinese application serial No. 200680037856.X, Dec. 2010 (5 pages).
Chinese Office Action received in Application serial No. 200580032112.4 dated Oct. 28, 2010 (27 pages).
Current Claims in Application serial No. 200580032112.4, Dec. 2010 (5 pages).
Faabor et al., A Goal-Oriented Web Browser, MIT Media Lab, Dated Apr. 2006, 10 pages.
Miller, Micahel, "The Ultimate Google Resource", Googlepedia: Second Edition, Dated Sep. 10, 2007, 5 pages.
Korean Office Action received in Application No. 2007-7005011 dated Sep. 26, 2011 (3 pages).
Korean Current Claims in Application No. 2007-7005011 dated Sep. 2011 (6 pages).
Chinese Office Action received in Application No. 200580032112.4 dated Jan. 6, 2012 (9 pages).
Current Claims in Chinese Application No. 200580032112.4 dated Jan. 2012 (6 pages).
Korean Office Action received in Application No. 2007-7005011 dated Mar. 2, 2012 (1 page).
Current Claims in Korean Application No. 2007-7005011 dated Mar. 2012 (11 pages).
Korean Office Action received in Divisional Application No. 10-2011-7031087 dated Mar. 2, 2012 (1 page).
Current Claims in Korean Divisional Application No. 10-2011-7031087 dated Mar. 2012 (4 pages).

* cited by examiner

TAGGING OFFLINE CONTENT WITH CONTEXT-SENSITIVE SEARCH-ENABLING KEYWORDS

FIELD OF THE INVENTION

The present invention relates to data processing and, more specifically, to tagging offline content with context-sensitive search-enabling keywords.

BACKGROUND

Although the Internet is a pervasive means of communicating information, it is not by any stretch of the imagination the exclusive means of doing so. The Internet has not completely replaced television and newspaper as a vehicle for conveying content to people. Those who wish to purvey content to large groups of others still often find traditional media to be an effective way of reaching an intended audience.

The Internet provides a level of interactivity that many other communication channels lack, though. Traditional television and newspaper content is "one-way" in nature. With such traditional media, content generally flows from a broadcaster or publisher to a viewer or reader, and does not provide an avenue whereby the content recipient can request customized information from the content provider. Sometimes the content recipient can respond to the content provider via other channels, such as by telephone or mail, but such channels are external to the medium by which the original content was conveyed. Using these external channels can be inconvenient for the content recipient.

Thus, outside of the Internet, viewers and readers are largely unable to demand, from content providers, additional information pertaining to the topics of the content that the viewers and readers are presented. Along with the content that they transmit, some cable and satellite television content providers include enhanced data that may indicate some details about the content that a viewer might find useful, such as names and summaries of televised programs. The information contained in such enhanced data is typically brief, often due to bandwidth limitations, and determined entirely by the content provider rather than the viewers. If the enhanced data lacks information that a viewer would like to know, the viewer is generally left without any convenient non-external means of obtaining that information. Even if the viewer had a convenient means of requesting additional information from the content provider, in many cases, the content provider might not be possession of, or in the business of supplying, the information sought.

Given the limitations of traditional media, a person will often turn to the Internet to seek additional information pertaining to content that he saw on television or read in the newspaper. Internet-based search engines enable people to obtain references to web pages that contain one or more specified words. Typically, a computer user can access a search engine by directing a web browser to a search engine "portal" web page. The portal page usually contains a text entry field and a button control. The user can initiate a search for web pages that contain specified query terms by typing those query terms into the text entry field and then activating the button control. When the button control is activated, the query terms are sent to the search engine, which typically returns, to the user's web browser, a dynamically generated web page that contains a list of references to other web pages that contain the query terms.

One drawback of using a search engine in this manner emerges from the context-insensitive manner in which search results are determined. Often, while a user is watching television or reading a newspaper, he may come across a topic about which he would like to obtain additional information. His curiosity piqued, the user might then direct his web browser to the portal page and submit, as query terms, words that he associates, in his mind, with the topic of interest. Hopefully, the results that the search engine returns include at least some references to web pages that pertain to the topic. Unfortunately, the results also may include a plethora of references to other web pages that contain the query terms, but have little or nothing to do with the topic.

For example, a user might see a television commercial for a new digital music-playing device being offered by a familiar computer-related business whose name happens to be the same as that of a fruit. The user might want to obtain additional information about the music-playing device, but he might not know what words he should use to describe the device. He might recall the name of the business from the television commercial, however. After submitting the name of the business to a search engine as a query term, the user may be disappointed to discover that the vast majority of the results returned by the search engine are references to web pages that pertain to the fruit rather than the business. The user is then faced with the options of prospecting through numerous pages of irrelevant references for a few elusive relevant references, trying to refine the query terms so that future search results will exclude irrelevant references but not relevant references, or abandoning the search entirely.

U.S. patent application Ser. No. 10/903,283, filed on Jul. 29, 2004, discloses techniques for performing context-sensitive searches. According to one such technique, a "source" web page may be enhanced with user interface elements that, when activated, cause a search engine to provide search results that are directed to a particular topic to which at least a portion of the "source" web page pertains. For example, such user interface elements may be "Y!Q" elements, which now appear in many web pages all over the Internet. For additional information on "Y!Q" elements, the reader is encouraged to submit "Y!Q" as a query term to a search engine.

Because they may be strategically positioned in a web page in close proximity to the content about which the user would want to search for information, the user interface elements described above provide a convenient mechanism for context-sensitive searching. A user can presume that if he initiates a search using a user interface element that is positioned in close proximity to a particular paragraph of text, that the search results obtained for the search will be constrained based on the topics to which the paragraph pertains.

Although the techniques described in the aforementioned patent application are tremendously useful, the techniques are only expressly described with application to Internet-delivered content such as web pages. If a person wants to search, on the Internet, for information about something that he saw on television or read in a newspaper, the person is largely left to his own genius in deciding how to formulate query terms that will lead to search results that are narrowly tailored to the thing that he saw or read about. As is discussed above, depending on how the person formulated the query terms, the search results may be vastly over-inclusive because the search results may lack specific context.

Some content providers give a little assistance to viewers and readers who might want to pursue related topics on the Internet. For example, some television programs and some printed materials seen these days include a uniform resource locator (URL). If the viewer or reader directs his web browser to the URL, he may be presented with a web page that the content provider has supplied. The contents of that web page are entirely dictated by the content provider, however, and are not truly customized according to the viewer's desires. The web page might consist entirely of information other than that in which the viewer is actually interested.

People who are exposed to information via traditional media channels often want some way of delving deeper into what they see. Previous approaches for allowing people to do so are often less effective for the reasons discussed above.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
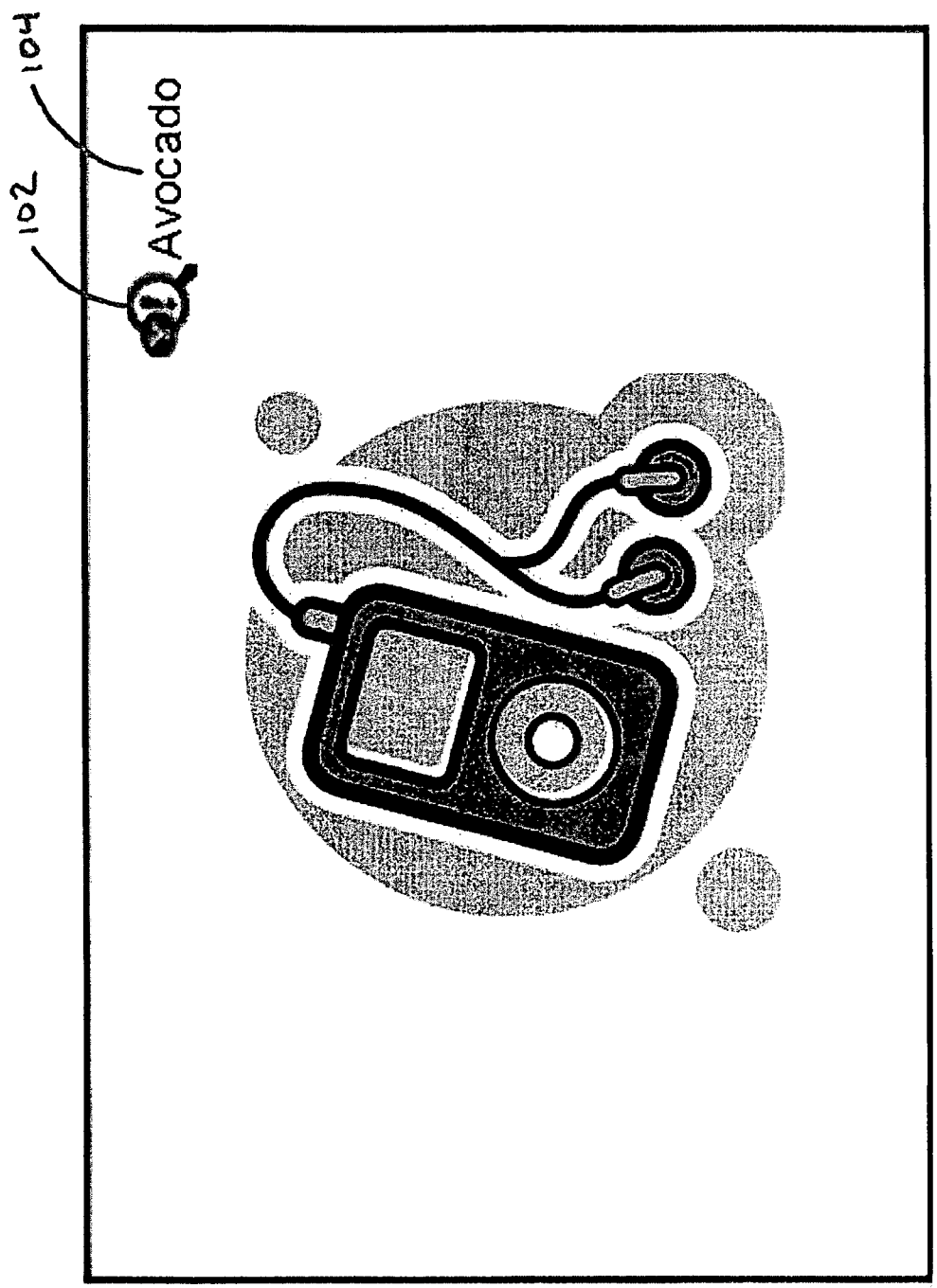
FIG. 1 is a diagram that illustrates an example of a television advertisement that has been tagged with a service indicator icon and associated keyword, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, "offline" or "non-web page" content-such as content that is displayed on television, in newspapers, in movies, in magazines, on billboards, on motor vehicles, on clothing, etc. (basically anything that is not displayed on a web page)—is "tagged" or partially "overlaid" with a service indicator icon that is associated with an information service. For example, the service indicator icon may be an icon that visually identifies the "Y!Q" information service. Along with the service indicator icon, and visually associated with the service indicator icon in the content, is a set of one or more words and/or computer-recognizable symbols. Examples described below will refer to a single keyword. The service indicator icon and the associated keyword may be placed within practically any content, including content that is not displayed in a web page. For example, a television broadcaster or a newspaper publisher (generically, a "content provider") may insert the service indicator icon and the associated keyword into the corner of a televised advertisement or within a printed column. The keyword may be displayed next to the service indicator icon, for example.

When a person sees the service indicator icon, he recognizes that he has the opportunity to direct his web browser to the URL of the information service that is associated with the service indicator icon. Because the service indicator icon uniquely identifies the information service, and because the URL of the information service can be well publicized and/or intuitive from the icon, the actual URL does not need to be displayed with the content. When the web browser is directed to the URL, a "form" web page is sent to the web browser and presented to the person. The web page comprises a text entry field into which the person can enter the keyword that he saw in the displayed content. After the person enters the keyword and activates a "submit" button control, the keyword is transmitted via the Internet to a process executing on the information service's web server.

The process receives the keyword and consults stored data to determine a set of information that is formally associated with the keyword. The association between the keyword and the set of information may be established prior to the time that the content is displayed to the person. The association may be established pursuant to a negotiated agreement between the information service provider, the content provider, and/or other interested entities. Among other data that may be contained in the set of information associated with the keyword are one or more search-limiting criteria. The search-limiting criteria may be specified by entities other than the information service provider, such as the content provider, for example. Typically, the search-limiting criteria includes one or more words, other than the keyword, that pertain to the displayed content and which disambiguate the specific meaning of the keyword, which might have several different meanings. In other words, the search-limiting criteria place the keyword in a specific context.

In one embodiment of the invention, after determining the search-limiting criteria that are associated with the keyword, the process submits the search-limiting criteria, and optionally the keyword also, as query terms to a search engine. The search engine may or may not be owned and operated by the information service provider. The search engine determines one or more other web pages that are deemed to be relevant based on the query terms, dynamically generates a "search results" web page that contains references to these other web pages, and returns the "search results" web page either to the person's web browser, via the Internet, or to the information service's process. Due to the automatic addition of the search-limiting criteria to the query terms, the set of web pages that the search engine determines to be relevant is narrower and more focused than the set otherwise would be. Significantly, the person who enters the keyword does not need to know anything about the search-limiting criteria. The person who enters the keyword may remain blissfully oblivious to the existence of the search-limiting criteria.

In embodiments of the invention in which the "search results" web page is returned to the information service's process, the process may dynamically generate an integrated results web page that incorporates elements of the "search results" web page. The integrated results web page may contain additional information as well. For example, the integrated results web page may contain data, other than the search-limiting criteria, that is in the set of information that is associated with the keyword, as described above. For a more specific example, the integrated results web page may contain an advertisement, hyperlinks, and/or other information that the content provider or another entity has arranged to have included in the integrated results web page. After dynamically generating the integrated results web page, the information service provider's process transmits the integrated results web page, via the Internet, to the person's web browser.

Thus, the person obtains additional information about topics that pertain to the content that he viewed. The additional information may comprise content-sensitive search results. Because the search results are dynamically generated in response to the person submitting the keyword to the information service, the search results will usually be more current and more relevant than if a "static" web page, which is not automatically generated in response to a keyword submission, had been presented to the person.

Tagging "OFFLINE" Display Content

FIG. 1 is a diagram that illustrates an example of a television advertisement that has been tagged with a service indicator icon and associated keyword, according to an embodiment of the invention. This particular advertisement is for a digital music player that is made and sold by a fictional business named "Avocado." The advertisement comprises a series of motion video frames, some of which show the digital music player.

According to one embodiment of the invention, the producer of the television advertisement or some other interested entity arranges with an information service provider to acquire, at least temporarily, the rights to the keyword "Avocado." The information service provider may provide, to various entities, temporary rights to various keywords at the service provider's discretion. These rights may be negotiated and given by the information service provider in exchange for monetary payment, for example. The information service provider also may provide, to various entities, the right to display an information service indicator icon that uniquely identifies the information service to people.

After the interested entity has obtained the rights to the keyword, the interested entity edits one or more motion video frames of the advertisement. Into one or more frames, the interested entity inserts an information service indicator icon 102 and a keyword 104. According to one embodiment of the invention, keyword 104 is any combination of computer-recognizable letters, numbers, and/or symbols. Keyword 104 may comprise more than one word. Typically, keyword 104 is displayed in close proximity to information service indicator icon 102 so that viewers will realize that keyword 104 is associated with information service indicator icon 102. Together, information service indicator icon 102 and keyword 104 form a "tag."

As discussed in the Overview, service indicator icon 102 identifies an information service. For example, the information service may be the "Y!Q" information service that is provided by Yahoo! Inc. When the television advertisement is broadcasted to television sets, viewers see the motion video frames that contain information service indicator icon 102 and keyword 104. Information service indicator icon 102 and keyword 104 appear to viewers for a specified period of time. Although the example above refers to televised content, information service indicator icon 102 and keyword 104 may also be inserted into or onto newspapers, movies, magazines, billboards, motor vehicles, clothing, etc., which are collectively referred to herein as "non-web page media." As used herein, a "non-web page medium" is any medium that is not a web page.

Viewers seeing information service indicator icon 102 and keyword 104 realize that, by directing their web browsers to the URL of the information service provider that is associated with information service indicator icon 102 and submitting keyword 104 to the information service provider via the Internet, the viewers can access a web page through which they can obtain additional related information about topics to which the advertisement pertains—in this case, the business named "Avocado" and their digital music player specifically.

Information Service User Interface

Figure 2:
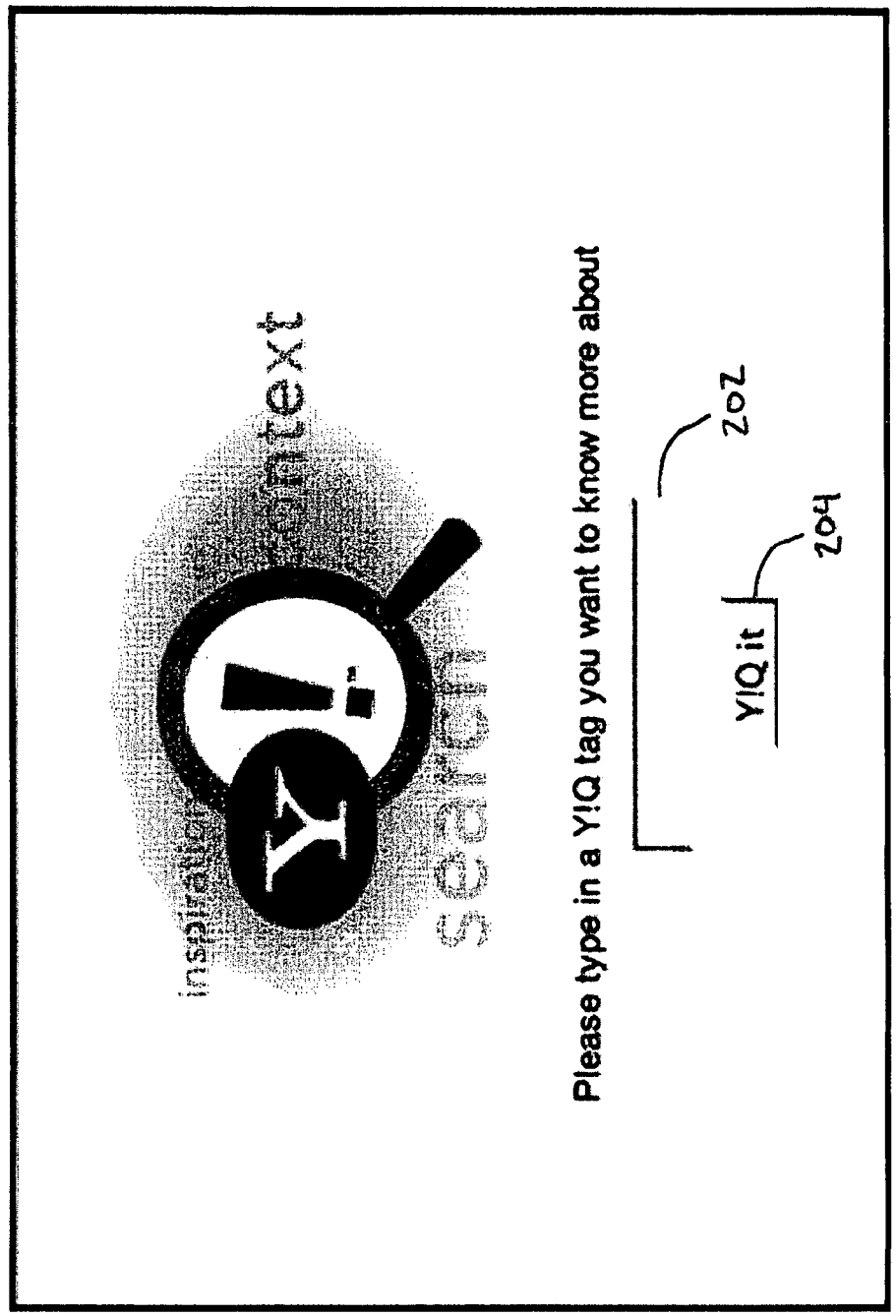
FIG. 2 is a diagram that illustrates an example of an information service provider's web page through which a user can submit a keyword, according to an embodiment of the invention.

FIG. 2 is a diagram that illustrates an example of an information service provider's web page through which a user can submit a keyword, according to an embodiment of the invention. Such a computer-generated web page is sent to a user's web browser when the user directs the web browser to the information service provider's URL. The web browser through which such a web page is viewed may be Mozilla Firefox, for example.

According to one embodiment of the invention, the web page comprises a text entry field 202 and a submit button control 204. Into text entry field 202, a user can enter keyword 104. After the user has entered keyword 104 into text entry field 202, the user can activate submit button control 204. When submit button control 204 is activated, the web browser automatically submits, over the Internet, to a process executing on the information service provider's web server, the contents of text entry field 202, comprising keyword 104.

Keyword-Associated Search-Limiting Criteria

According to one embodiment of the invention, an interested entity, such as the entity that obtained the rights to keyword 104, provides the information service provider with a set of one or more search-limiting criteria that should be associated with keyword 104. As is discussed in the Overview, the search-limiting criteria typically includes one or more words, other than keyword 104, that pertain to the content into which keyword 104 has been inserted and which disambiguate the specific meaning of keyword 104, which might have several different meanings. In other words, the search-limiting criteria place the keyword in a specific context.

For example, an interested entity might request that the search-limiting terms "computer" and "digital music player" be associated with keyword 104. In response to the interested entity's request, the information service provider may establish an association between keyword 104 and these search-limiting terms. The information service provider may store the association in a database or other data storage repository that permits a lookup of search-limiting criteria based on the keyword with which those search-limited criteria are associated. Thus, according to one embodiment of the invention, the information service provider maintains a repository that comprises one or more different keywords, each keyword being associated with one or more search-limiting criteria.

Typically, the information service provider will establish the association prior to the time that the content that contains information service indicator icon 102 and a keyword 104 is displayed. The association may be established on a temporary basis. Thus, at different times, a particular keyword may become associated with different keywords. The rights to a particular keyword may pass between various entities at various times.

According to one embodiment of the invention, the search-limiting criteria comprise or are contained within a context vector such as is disclosed in U.S. patent application Ser. No. 10/903,283, titled "SEARCH SYSTEMS AND METHODS USING IN-LINE CONTEXTUAL QUERIES," the contents of which patent application are incorporated by reference in their entirety for all purposes, as though originally disclosed herein.

Context-Sensitive Search Results

As is disclosed in the Overview, the search-limiting criteria that are associated with keyword 104 serve to narrow and focus the results of a search for relevant web pages. A search for web pages that contain the word "avocado" might produce many results that pertain to the avocado fruit. However, a search for web pages that contain all of the words "avocado," "computer," and "digital music player" might produce fewer results, and results that pertain more specifically to a digital music player that is made and sold by a computer-oriented business named "Avocado."

According to one embodiment of the invention, a process executing on the information service provider's web server receives keyword 104 via the Internet after a user activates submit button control 204. Upon receiving keyword 104, the process consults a database or other data storage repository in which associations between keywords and search-limiting criteria are maintained. The process determines a set of information that is associated with keyword 104. Within this set of information are the search-limiting criteria that were previously associated with keyword 104. As is mentioned above, the search-limiting criteria may take the form of a context vector.

In one embodiment of the invention, after the appropriate search-limiting criteria have been determined, the process submits both keyword 104 and the associated search-limiting criteria to a search engine as query terms. In another embodiment of the invention, rather than submitting the associated search-limiting criteria themselves to the search engine as query terms, the process generates query terms (a "search query") based at least in part on the search-limiting criteria. In such an embodiment of the invention, the search query may lack one or more of the search-limiting criteria.

The search engine may be hosted on the same web server as the process. Indeed, the search engine may be integrated with the process itself. Alternatively, the search engine may be entirely external to the information service. In the latter case, the process may submit the keyword 104 and the associated search-limiting criteria to a search engine via the Internet.

In one embodiment of the invention, the search engine receives keyword 104 and the associated search-limiting criteria and uses these, or information derived from these, as query terms. The search engine conducts a search of web pages that it has previously discovered on the Internet and indexed so as to be organized and searchable by query term. In one embodiment of the invention, the search engine does not include a particular web page within search results unless the particular web page contains at least one instance of at least one of the search-limiting criteria. In another embodiment of the invention, the search engine does not exclude a particular web page from search results even if the particular web page lacks all of the search-limiting criteria (but contains at least one instance of keyword 104), but ranks web pages that lack one or more search-limiting criteria lower in a list of search results than web pages that contain all of the search-limiting criteria. In many embodiments of the invention, after the search engine has determined a set of relevant web pages based on the query terms, the search engine ranks the relevant web pages by relevance score and then sorts the relevant web pages by rank. The search engine generates a sorted list of references to the relevant web pages. Thus, the search results are limited based on the search-limiting criteria that are associated with keyword 104.

In one embodiment of the invention, the search engine dynamically generates a web page that comprises at least a part of the sorted list of references and returns the web page to the user's web-browser as a response to the user's earlier submission of keyword 104 through the web browser.

In another embodiment of the invention, instead of returning data to the user's web browser, the search engine returns the sorted list of references to the process from which the search engine received keyword 104 and the associated search-limiting criteria. In such an embodiment of the invention, the process dynamically generates an "integrated results" web page that incorporates elements of the sorted list of references. The process may include, in the integrated results web page, additional information obtained from the set of information that is associated with keyword 104 in the data storage repository. Some examples of such additional information are described in further detail below. After the process has dynamically generated the integrated results web page, the process returns the integrated results web page to the user's web browser as a response to the user's earlier submission of keyword 104 through the web browser.

Integrated Results Web Page

In one embodiment of the invention, when the information service provider establishes the association between keyword 104 and the set of information, the information service provider includes, in the set of information, a specified source of the content that contains keyword 104. For example, if the television advertisement discussed above is going to be broadcast on a particular television channel, then the set of information may indicate that the particular television channel is the content source. When the integrated results web page is generated, a statement that indicates the content source for keyword 104 may be inserted into the integrated results web page. The content source may be the television channel or the newspaper that provided the content, for example. For example, if the content source is "The Gadget Channel," then towards the top of the integrated results web page, there may be a statement such as: "Thanks for looking up Avocado while watching The Gadget Channel. We have compiled some related information that you may find useful."

In one embodiment of the invention, the set of information associated with keyword 104 additionally comprises one or more sponsored advertisements, which may comprise hyperlinks to other web pages. Such sponsored advertisements may be purchased from the information service provider, according to one embodiment of the invention. An interested entity might want to have its advertisement associated with keyword 104 especially if the interested entity's advertised product or services are estimated to be of interest to those who are likely to view the displayed content into which keyword 104 will be inserted. If the set of information comprises such sponsored advertisements, then the sponsored advertisements are inserted into the integrated results web page when the page is being dynamically generated.

In one embodiment of the invention, the set of information associated with keyword 104 additionally comprises one or more references to web pages that an interested entity believes are pertinent to the subject of the displayed content into which keyword 104 was inserted. These references may be limited to those that are specifically provided by the entity that currently owns the rights to keyword 104. For example, the references may comprise a hyperlink to the "Avocado" company website. Each hyperlink may be accompanied by a brief description of a web site to which the hyperlink refers. Such descriptions may be supplied by the same entity that provided the hyperlinks. If the set of information comprises such references, then the references are inserted into the integrated results web page when the page is being dynamically generated.

In one embodiment of the invention, the set of information additionally comprises one or more references to categorized web pages that pertain to topics that belong to the same categories to which keyword 104 is deemed by the information service provider to belong. For example, if the information service provider decides that "Avocado" belongs to the "computer" and "music" categories within a specified hierarchy of categories, then the set of information may comprise one or more references and/or hyperlinks to web pages that the information service provider has categorized as belonging to at least one of those categories. Alternatively, the set of information may contain the identities of the related categories themselves, and web pages that pertain to topics that belong to those categories may be determined dynamically when the integrated results web page is being dynamically generated. When the integrated results web page is being dynamically generated, one or more of these "related category" references, if any, may be inserted into the integrated results web page.

During the generation of the integrated results web page, one or more search results that were narrowed based on the search-limiting criteria, as described above, also may be inserted into the integrated results web page. For example, the process generating the integrated results web page may receive a sorted list of references from a search engine, extract references from the sorted list, and insert the references into the integrated results web page.

Thus, the integrated results web page may contain supplementary information in addition to search results that are based on the search-limiting criteria associated with keyword 104.

Example Information Service Technique

Figure 3:
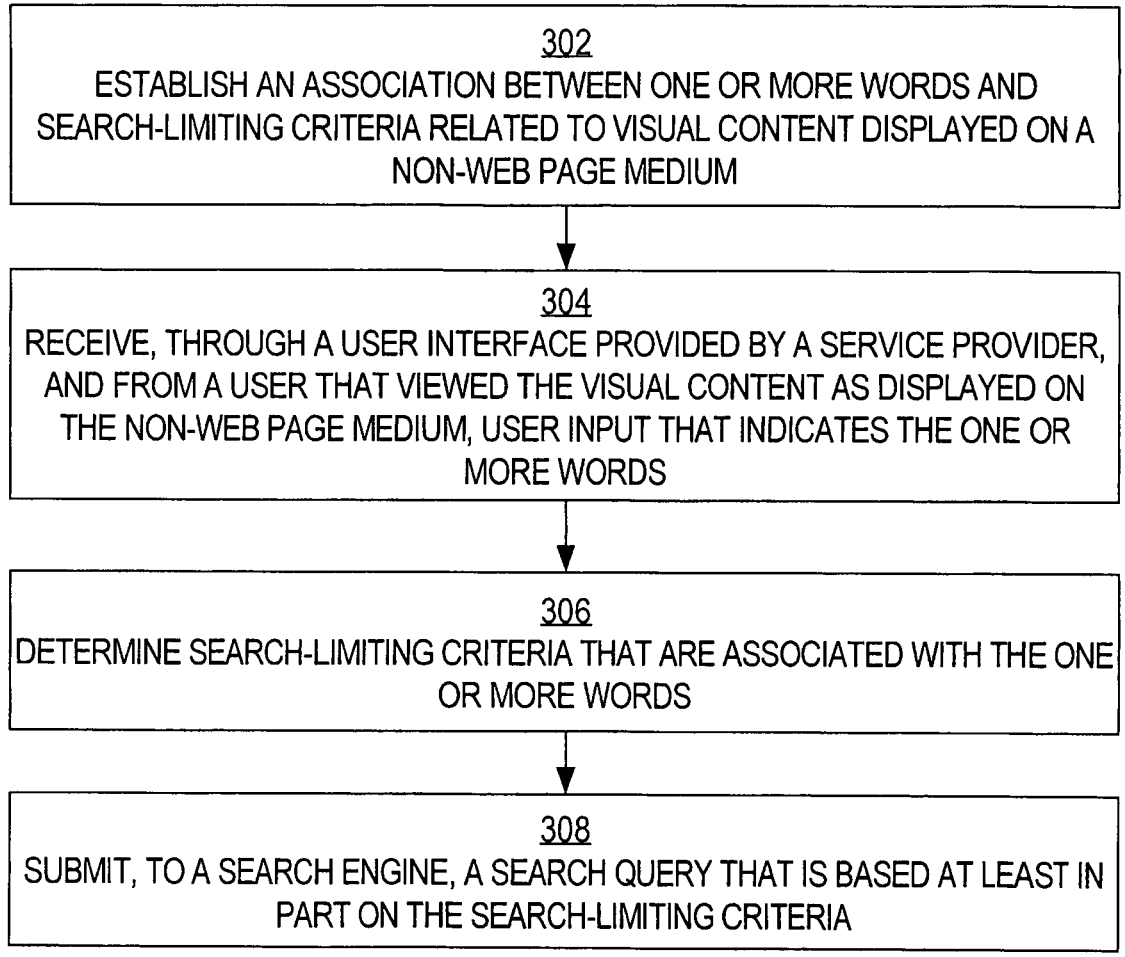
FIG. 3 is a flow diagram that illustrates an example of a technique for providing additional information to a viewer of visual content that displays a tag as described herein, according to an embodiment of the invention.

FIG. 3 is a flow diagram that illustrates an example of a technique for providing additional information to a viewer of visual content that displays a tag as described above, according to an embodiment of the invention. One or more steps of the flow shown in FIG. 3 may be performed by the information service provider and/or by a process executing on the information service provider's web server, for example.

In block 302, an association is established between one or more words and search-limiting criteria related to visual content displayed on a non-web page medium (e.g., a television program). For example, an information service provider may establish an association between keyword 104 and search-limiting criteria "computer" and "digital music player." At least after the visual content has been modified (e.g., by a content provider), the visual content displays the one or more words and a service indicator that identifies a service, as described above. One example of such a service indicator is information service indicator icon 102. According to one embodiment of the invention, the search-limiting criteria are not displayed in the visual content.

In block 304, user input that indicates the one or more words is received, through a user interface provided by a service provider that provides the service, from a user that viewed the visual content as displayed on the non-web page medium. For example, the information service provider's web server may receive keyword 104 from a viewer's web browser after the viewer saw, on a television program, keyword 104 displayed in association with information service indicator icon 102.

In block 306, in response to receiving the user input, search-limiting criteria that are associated with the one or more words are determined. For example, a process executing on the information service provider's web server may determine that the search-limiting criteria "computer" and "digital music player" are associated with keyword 104.

In block 308, in response to determining the search-limiting criteria that are associated with the one or more words, a search query that is based at least in part on the search-limiting criteria is submitted to a search engine. For example, the process discussed above may submit the words "avocado," "computer," and "digital music player" as query terms to a search engine. The search engine may provide search results, and additional operations then may be performed as discussed above.

Temporarily Renting Keywords and Archiving Past Associations

According to one embodiment of the invention, the information service provider rents, to an interested entity, rights to display keyword 104 along with information service indicator icon 102 for a specified period of time. In exchange for these rights, the information service provider may require a specified sum of money, or other negotiated compensation, from the interested entity. After a rental agreement has been reached, the information service provider establishes an association between keyword 104 and the set of information as described above. As discussed above, the set of information may comprise advertisements and links that are supplied by the current owner of the rights to display keyword 104 along with information service indicator icon 102.

According to one embodiment of the invention, keyword 104 may be associated with multiple separate sets of information, only one of which is current at any given time. Because rights to display keyword 104 may be rented to a variety of different interested entities over time, keyword 104 may become associated with different sets of information over time. For example, although keyword 104 may currently be associated with a set of information pertaining to a digital music player, at an earlier time, keyword 104 might have been associated a set of information pertaining to a produce farm.

Therefore, according to one embodiment of the invention, the information service provider maintains, in a data storage repository, an archive of sets of information that were associated with keyword 104 in times past, even if those sets of information are not currently associated with keyword 104 due to a change in rights ownership. In one embodiment of the invention, each set of information associated with keyword 104 indicates a range of dates and/or times during which keyword 104 was associated with that set of information.

In one embodiment of the invention, the integrated results web page discussed above contains a hyperlink to an "archive" web page. The "archive" web page contains a separate hyperlink for each separate set of information with which keyword 104 was associated during its existence. Each hyperlink may be accompanied with identifying information, such as the identity of the content source that is identified in the set of information that corresponds to that hyperlink, and/or the range of dates and/or times during which keyword 104 was associated with that set of information. In one embodiment, the identifying information comprises a thumbnail image of the displayed content into which keyword 104 was inserted.

In one embodiment of the invention, activating a hyperlink in the "archive" web page causes an integrated results web page to be generated and sent to the web browser from which the hyperlink was activated. Under such circumstances, the integrated results web page is not generated based on the set of information and search-limited criteria that are currently associated with keyword 104. Instead, the integrated results web page is dynamically generated based on the set of information and search-limited search criteria that were associated with keyword 104 during the period of time indicated.

Thus, in one embodiment, for any particular keyword, a user can view integrated results web pages of the past, as well as the present, for that particular keyword.

Example Business Models

One of the purposes for providing an integrated results web page to users as described above is so that the information service provider can make money in exchange for providing the information service. There are various ways in which the information service provider can capitalize on the business opportunities created by the information service.

For example, according to one embodiment of the invention, the information service provider auctions off rights to display specified keywords in displayed content for a limited period of time. Interested entities can submit, to the information service provider, bids for specified keywords and date/time ranges. After bidding has closed, the information service provider obtains an agreed-upon amount of money from the highest-bidding interested entity, and, in exchange, establishes an association between the specified keyword and a set of information supplied by the highest-bidding interested entity. The association remains intact for the duration of time specified in the auction. After the specified rental period for the current rights owner has elapsed relative to a particular keyword, the information service provider may again auction off rights to display to the particular keyword.

According to one embodiment, the information service provider may auction off rights to a particular keyword to different interested entities at different periods of time in the future. For example, even while a first interested entity currently owns the rights to display keyword 104, the information service provider may sell, to a second interested entity, the rights to display keyword 104 after the first interested entity's rights have expired. To take the example further, the information service provider may sell, to a third interested entity, the rights to display keyword 104 after the second interested entity's rights have expired. In this manner, the information service provider may "book" rights to display keyword 104 well into the future.

According to certain embodiments of the invention, the information service provider may additionally sell, to interested entities other than the current owner of the rights to display keyword 104, advertising space on at least some of the integrated results web pages that are dynamically generated in response to the submission of keyword 104. Interested entities that purchase this advertising space may have their hyperlinks and accompanying text inserted into the set of information currently associated with keyword 104.

The information service provider is not the only entity that can make money from the information service. According to one embodiment, a content provider, such as a television broadcaster or newspaper publisher, can sell, to interested entities, space within the content that the content provider provides-space in which keywords may be displayed as described above. For example, a television broadcaster might sell times and spaces ("spots") within the motion video frames of a particular television program or advertisement. Interested entities could then purchase, from the television broadcaster, the rights to display, in the specified times and places, keywords for which those interested entities have obtained display rights from the information service provider, or interested entity-specified keywords for which the television broadcaster agrees to obtain display rights from the information service provider on behalf of the interested entities. After selling the time/spaces, the television broadcaster can insert the specified keywords into the appropriate place in the displayed content prior to the actual displaying of that content, per the terms of the agreement binding the television broadcaster and the interested entities.

According to one embodiment of the invention, the information service provider acts as a broker between the content provider and advertisers. In such an embodiment, the content provider indicates, to the information service provider, times and/or spaces within the content provider's content that the content provider is making available for keyword display. The information service provider then advertises the times and spaces to prospective advertisers who would be interested in reaching an audience that is likely to view the content. The information service provider sells keyword display rights to the advertisers and gives a portion of the sale proceeds to the content provider. In exchange for this portion of the sale proceeds, the content provider inserts, into the agreed spaces and at the agreed times in the content, the keywords for which the advertisers have purchased display rights.

In order to further motivate content providers to participate in the above system, in one embodiment of the invention, the information service provider agrees to pay a content provider a specified amount of money for each time that a keyword displayed in the content provider's content is submitted to the information service provider's web server. For example, the information service provider could agree to give, to the television broadcaster of the advertisement described above with reference to FIG. 1, a specified amount of money every time that the keyword "Avocado" is submitted via the "form" web page described above with reference to FIG. 2, for as long as the television broadcaster owns the display rights for the keyword "Avocado." Additionally or alternatively, the information service provider could agree to pay an entity a specified amount of money every time that a user activates a hyperlink that is contained in a web page that the information service provider dynamically generated in response to the submission of a keyword for which the entity currently owns the display rights.

Hardware Overview

Figure 4:
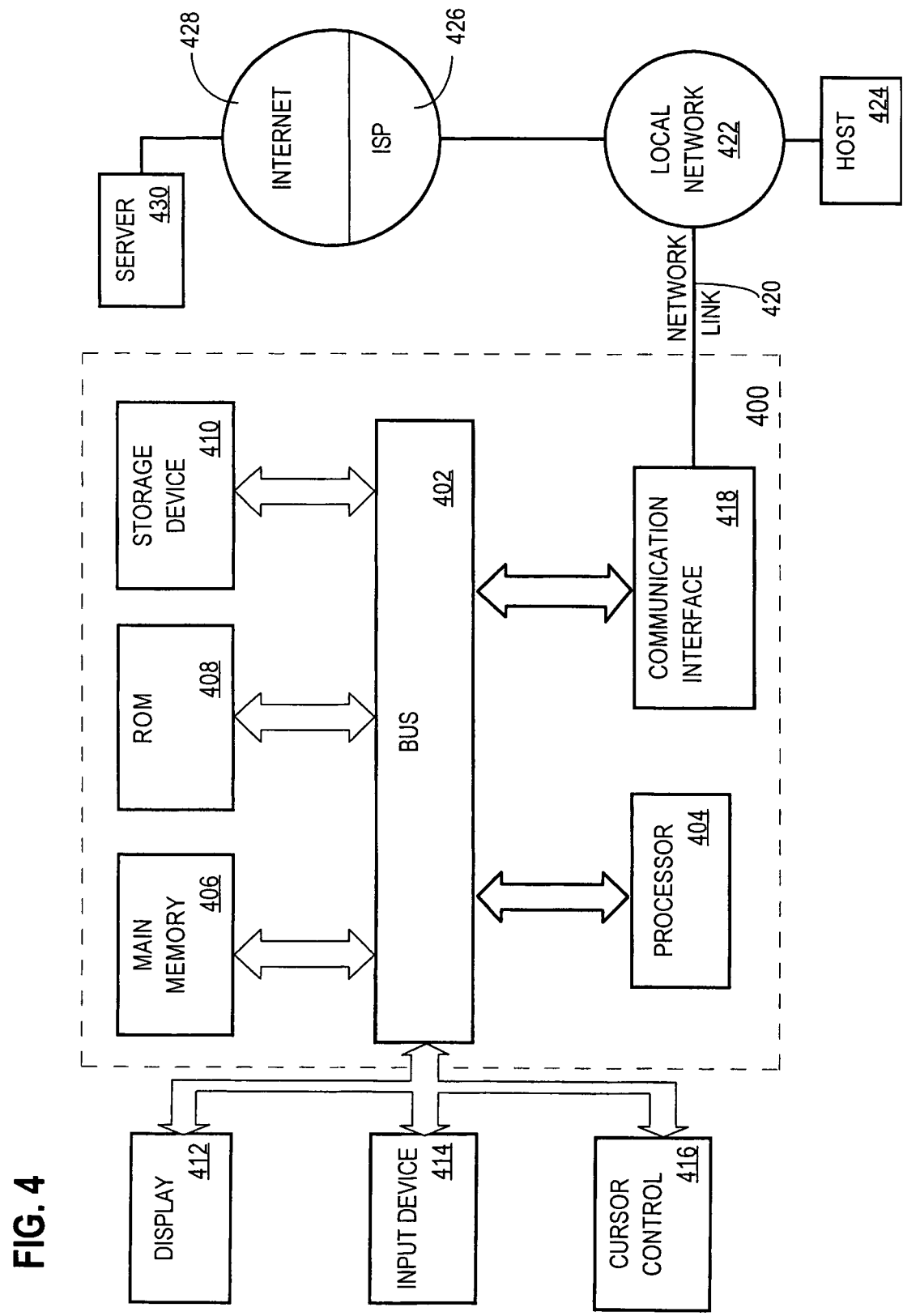
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions which, when processed by one or more processors, cause:

an information service receiving, over one or more communications networks from a client device, one or more alphanumeric keywords, wherein both the one or more alphanumeric keywords and an information service indicator that uniquely identifies the information service are displayed to a user of the client device in visual content on a non-Web page medium;

the information service identifying, at a first time, one or more first search-limiting criteria that both correspond to the one or more alphanumeric keywords and provide a first context for the one or more alphanumeric keywords, wherein the one or more first search-limiting criteria are not included in the visual content on the non-Web page medium;

the information service providing both the one or more alphanumeric keywords and the one or more first search-limiting criteria to a search engine, wherein the search engine performs a first search using both the one or more alphanumeric keywords and the one or more first search-limiting criteria and generates first search results;

the information service receiving the first search results from the search engine;

the information service transmitting the first search results over the one or more communications networks to the client device;

the information service identifying, at a second time that is different than the first time, one or more second search-limiting criteria that both correspond to the one or more alphanumeric keywords and provide, for the one or more alphanumeric keywords, a second context that is different than the first context; and the information service providing both the one or more alphanumeric keywords and the one or more second search-limiting criteria to the search engine, wherein the search engine performs a second search using both the one or more alphanumeric keywords and the one or more second search-limiting criteria and generates second search results.

2. The one or more non-transitory computer-readable media of claim 1, wherein the non-Web page medium is one or more of a televised transmission signal or paper within a periodical publication.

3. The one or more non-transitory computer-readable media of claim 1, wherein the one or more first search-limiting criteria include one or more additional alphanumeric keywords.

4. The one or more non-transitory computer-readable media of claim 1, wherein:

the one or more non-transitory media include additional instructions which, when processed by the one or more processors, cause the information service to generate one or more Web pages that include the first search results, wherein the first search results include references to one or more other Web pages that each includes at least one of the one or more alphanumeric keywords and the one or more first search-limiting criteria, and the information service transmitting the first search results over the one or more communications networks to the client device includes the information service transmitting the one or more Web pages to the client device.

5. The one or more non-transitory computer-readable media of claim 1, wherein neither the one or more alphanumeric keywords nor the information service indicator are URLs.

6. The one or more non-transitory computer-readable media of claim 1, wherein: the one or more non-transitory media include additional instructions which, when processed by the one or more processors, cause:

the information service receiving, from the client device, a request for a Web page of the information service provider that allows a user to enter a search query, and in response to receiving the request from the client device, the information service provider transmitting the Web page to the client device to allow a user of the client device to enter the one or more alphanumeric keywords.

7. The one or more non-transitory computer-readable media of claim 1, wherein: the one or more non-transitory media include additional instructions which, when processed by the one or more processors, cause: the information service establishing a correspondence between the one or more first search-limiting criteria and the one or more alphanumeric keywords in response to receiving the one or more first search-limiting criteria from a content provider that both is separate from the information service and manages the visual content.

8. The one or more non-transitory computer-readable media of claim 1, wherein: the one or more non-transitory media include additional instructions which, when processed by the one or more processors, cause one or more of temporarily renting or auctioning, to one or more interested entities, rights to display, for a specified time, the one or more alphanumeric keywords in conjunction with the information service.

9. An apparatus comprising:

one or more processors; and one or more memories storing instructions which, when processed by one or more processors, cause:

an information service receiving, over one or more communications networks from a client device, one or more alphanumeric keywords, wherein both the one or more alphanumeric keywords and an information service indicator that uniquely identifies the information service are displayed to a user of the client device in visual content on a non-Web page medium;

the information service identifying, at a first time, one or more first search-limiting criteria that both correspond to the one or more alphanumeric keywords and provide a first context for the one or more alphanumeric keywords, wherein the one or more first search-limiting criteria are not included in the visual content on the non-Web page medium;

the information service providing both the one or more alphanumeric keywords and the one or more first search-limiting criteria to a search engine, wherein the search engine performs a first search using both the one or more alphanumeric keywords and the one or more first search-limiting criteria and generates first search results;

the information service receiving the first search results from the search engine;

the information service transmitting the first search results over the one or more communications networks to the client device;

the information service identifying, at a second time that is different than the first time, one or more second search-limiting criteria that both correspond to the one or more alphanumeric keywords and provide, for the one or more alphanumeric keywords, a second context that is different than the first context; and the information service providing both the one or more alphanumeric keywords and the one or more second search-limiting criteria to the search engine, wherein the search engine performs a second search using both the one or more alphanumeric keywords and the one or more second search-limiting criteria and generates second search results.

10. The apparatus of claim 9, wherein the non-Web page medium is one or more of a televised transmission signal or paper within a periodical publication.

11. The apparatus of claim 9, wherein the one or more first search-limiting criteria include one or more additional alphanumeric keywords.

12. The apparatus of claim 9, wherein:
the one or more memories store additional instructions which, when processed by the one or more processors, cause the information service to generate one or more Web pages that include the first search results, wherein the first search results include references to one or more other Web pages that each includes at least one of the one or more alphanumeric keywords and the one or more first search-limiting criteria, and
the information service transmitting the first search results over the one or more communications networks to the client device includes the information service transmitting the one or more Web pages to the client device.

13. The apparatus of claim 9, wherein neither the one or more alphanumeric keywords nor the information service indicator are URLs.

14. The apparatus of claim 9, wherein: the one or more non-transitory media include additional instructions which, when processed by the one or more processors, cause:
the information service receiving, from the client device, a request for a Web page of the information service provider that allows a user to enter a search query, and
in response to receiving the request from the client device, the information service provider transmitting the Web page to the client device to allow a user of the client device to enter the one or more alphanumeric keywords.

15. The apparatus of claim 9, wherein: the one or more memories store additional instructions which, when processed by the one or more processors, cause: the information service establishing a correspondence between the one or more first search-limiting criteria and the one or more alphanumeric keywords in response to receiving the one or more first search-limiting criteria from a content provider that both is separate from the information service and manages the visual content.

16. The apparatus of claim 9, wherein: the one or more memories store additional instructions which, when processed by the one or more processors, cause one or more of temporarily renting or auctioning, to one or more interested entities, rights to display, for a specified time, the one or more alphanumeric keywords in conjunction with the information service.

17. A computer-implemented method comprising:
an information service receiving, over one or more communications networks from a client device, one or more alphanumeric keywords, wherein both the one or more alphanumeric keywords and an information service indicator that uniquely identifies the information service are displayed to a user of the client device in visual content on a non-Web page medium;
the information service identifying, at a first time, one or more first search-limiting criteria that both correspond to the one or more alphanumeric keywords and provide a first context for the one or more alphanumeric keywords, wherein the one or more first search-limiting criteria are not included in the visual content on the non-Web page medium;
the information service providing both the one or more alphanumeric keywords and the one or more first search-limiting criteria to a search engine, wherein the search engine performs a first search using both the one or more alphanumeric keywords and the one or more first search-limiting criteria and generates first search results;
the information service receiving the first search results from the search engine;
the information service transmitting the first search results over the one or more communications networks to the client device;
the information service identifying, at a second time that is different than the first time, one or more second search-limiting criteria that both correspond to the one or more alphanumeric keywords and provide, for the one or more alphanumeric keywords, a second context that is different than the first context; and
the information service providing both the one or more alphanumeric keywords and the one or more second search-limiting criteria to the search engine, wherein the search engine performs a second search using both the one or more alphanumeric keywords and the one or more second search-limiting criteria and generates second search results.

18. The computer-implemented method of claim 17, wherein neither the one or more alphanumeric keywords nor the information service indicator are URLs.

* * * * *